(12) United States Patent
Hu

(10) Patent No.: US 12,542,498 B2
(45) Date of Patent: Feb. 3, 2026

(54) MULTIPHASE INVERTER CIRCUIT FOR GENERATING TARGET AC POWER BASED ON DC POWER PROVIDED BY DC POWER SUPPLY AND ITS MODULATION METHOD

(71) Applicant: Huizhou RoyPow Technology Co., Ltd., Guangdong Province (CN)

(72) Inventor: Yanshen Hu, Guangdong Province (CN)

(73) Assignee: HUIZHOU ROYPOW TECHNOLOGY CO., LTD., Guangdong Province (CN)

( * ) Notice: Subject to any disclaimer, the term of this patent is extended or adjusted under 35 U.S.C. 154(b) by 159 days.

(21) Appl. No.: 18/226,451

(22) Filed: Jul. 26, 2023

(65) Prior Publication Data
US 2024/0195325 A1   Jun. 13, 2024

(30) Foreign Application Priority Data
Dec. 12, 2022  (CN) .......................... 202211588957.3

(51) Int. Cl.
*H02M 7/493* (2007.01)
*H02M 1/00* (2007.01)

(52) U.S. Cl.
CPC ......... *H02M 7/493* (2013.01); *H02M 1/0064* (2021.05); *H02M 1/0051* (2021.05)

(58) Field of Classification Search
CPC .... H02M 7/493; H02M 1/0064; H02M 7/483; H02M 1/0051; H02M 1/0058; H02M 7/49; H02M 1/008
See application file for complete search history.

(56) References Cited

U.S. PATENT DOCUMENTS

| | | | |
|---|---|---|---|
| 2007/0211507 A1 | 9/2007 | Ilic | |
| 2011/0299311 A1* | 12/2011 | Zhu | H02M 1/126 363/132 |

(Continued)

FOREIGN PATENT DOCUMENTS

| | | |
|---|---|---|
| CN | 104052326 A | 9/2014 |
| CN | 104333248 A | 2/2015 |

(Continued)

OTHER PUBLICATIONS

"Topology Investigation for Multi-Level Inversion Using a 3-Terminal Switch-Network", China Academic Journal Electronic Publishing House, 37 pages (English Abstract).

(Continued)

*Primary Examiner* — Gustavo A Rosario-Benitez
(74) *Attorney, Agent, or Firm* — CANTOR COLBURN LLP

(57) ABSTRACT

A multiphase inverter circuit and a modulation method thereof. The multiphase inverter circuit is configured for generating a target alternating current power based on a direct current power provided by a DC power supply, and the multiphase inverter circuit includes at least one non-interleaved inverter circuit; the non-interleaved inverter circuit includes: a first bridge arm unit, a second bridge arm unit, and an inverting coupling transformer. When the first pulse signal and the second pulse signal with a phase difference pass through the inverting coupling transformer, a current loop can be formed within the non-interleaved inverter circuit so that the body diodes of the power transistors conduct before the power transistors conduct, thereby reducing the reverse recovery power consumption of the body diode of the corresponding power transistor and realizing zero-voltage soft switching.

20 Claims, 7 Drawing Sheets

(56) References Cited

U.S. PATENT DOCUMENTS

| | | | | |
|---|---|---|---|---|
| 2015/0349662 A1* | 12/2015 | Jiang | .................... | H02M 7/5395 |
| | | | | 363/71 |
| 2016/0352253 A1* | 12/2016 | Liu | .................... | H02M 7/53871 |
| 2017/0070163 A1 | 3/2017 | Pahlevaninezhad et al. | | |
| 2019/0356241 A1* | 11/2019 | Fang | .................... | H02M 7/5395 |
| 2021/0359594 A1* | 11/2021 | Zhang | ................. | H02M 1/4216 |
| 2021/0391801 A1 | 12/2021 | Colonna | | |
| 2022/0402390 A1* | 12/2022 | Smolenaers | ............ | H02J 3/322 |

FOREIGN PATENT DOCUMENTS

| | | | |
|---|---|---|---|
| CN | 104333250 A | | 2/2015 |
| CN | 104796030 A | | 7/2015 |
| CN | 105024570 A | * | 11/2015 |
| CN | 107294129 A | * | 10/2017 |
| CN | 112448573 A | | 3/2021 |
| CN | 112448605 A | | 3/2021 |
| CN | 112448652 A | | 3/2021 |

OTHER PUBLICATIONS

Stanley, G.R. et al. "Precision DC-to-AC power conversion by optimization of the output current waveform-the half pridge revisited" IEEE Transactions on Power Electronics, vol. 14, No. 2, Mar. 1999, 9 pages.

* cited by examiner

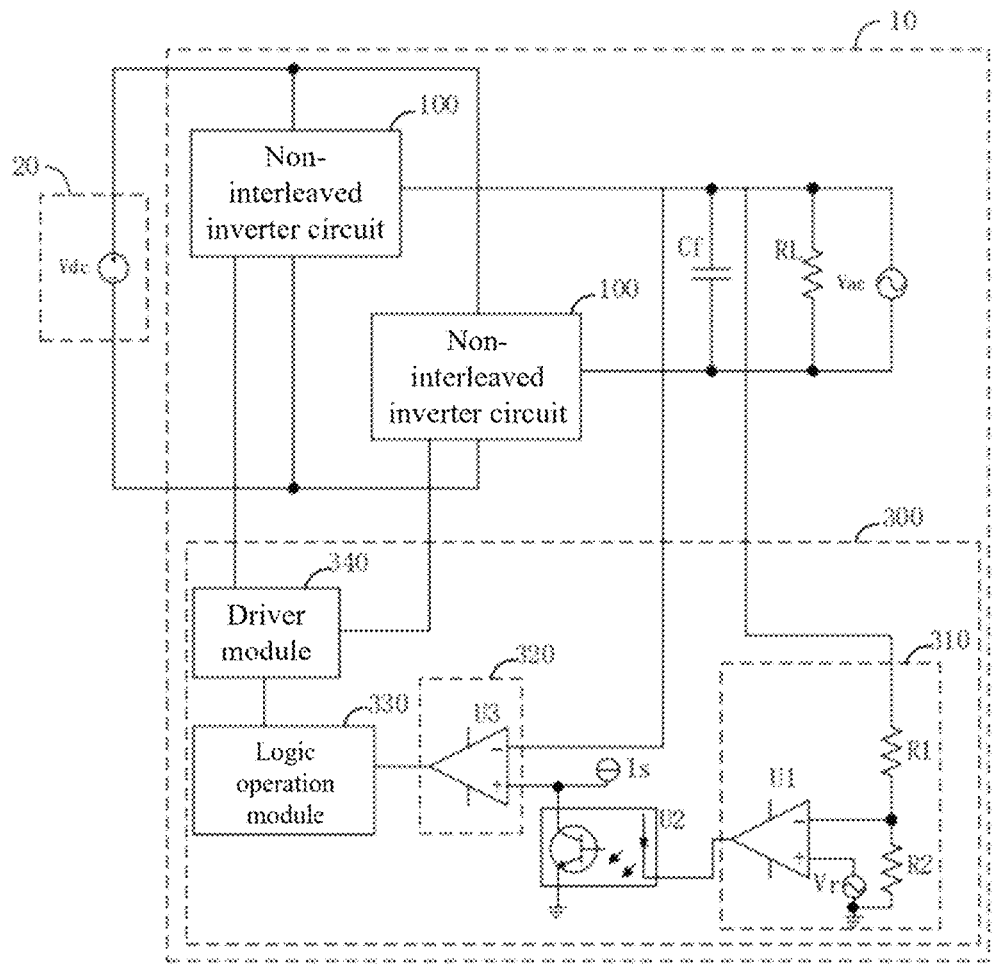

FIG. 10

- S100
Generating and outputting to the first bridge arm unit a first upper bridge arm drive voltage and a first lower bridge arm drive voltage for driving the first bridge arm unit to generate a first pulse signal

- S200
Generating and outputting to the second bridge arm unit a second upper bridge arm drive voltage and a second lower bridge arm drive voltage for driving the second bridge arm unit to generate a second pulse signal

FIG. 11

MULTIPHASE INVERTER CIRCUIT FOR GENERATING TARGET AC POWER BASED ON DC POWER PROVIDED BY DC POWER SUPPLY AND ITS MODULATION METHOD

CROSS-REFERENCE TO RELATED APPLICATIONS

The present application claims the benefit of Chinese patent application No. 202211588957.3 filed on Dec. 12, 2022, titled "Multiphase Inverter Circuit and Modulation Method", the entire contents of which are incorporated herein by reference.

TECHNICAL FIELD

The present application relates to the field of power electronics, and in particular, to a multiphase inverter circuit and a modulation method.

BACKGROUND

Currently, inverters mainly consist of DC/AC converter circuits and their controllers, and the DC/AC circuit topology usually uses a full-bridge inverter circuit. Since it uses four power transistor transistors and their body diodes, it is also generally called the H4 topology. When the H4 topology adopts the traditional bipolar high-frequency sinusoidal pulse width modulation (SPWM) method, the four power transistor transistors work in the high-frequency hard-switching state, and the switching power consumption is large, especially the reverse recovery power consumption of the body diode. The conversion efficiency is low because of the large reverse recovery power consumption of the body diode. In order to improve the conversion efficiency, unipolar or hybrid modulation methods can also be used, but it will cause higher common-mode interference and higher leakage current.

SUMMARY

An objective of the present application is to provide a multiphase inverter circuit and a modulation method, which aims to solve the problem of large switching power consumption of the conventional inverter circuit.

A first aspect of an embodiment of the present application provides a multiphase inverter circuit for generating a target alternating current (AC) power based on a direct current (DC) power provided by a DC power supply, the multiphase inverter circuit includes at least one non-interleaved inverter circuit, each non-interleaved inverter circuit for outputting an AC voltage corresponding to a phase, the target AC power includes the AC voltage; the non-interleaved inverter circuit includes: a first bridge arm unit, a second bridge arm unit, and an inverting coupling transformer; the first bridge arm unit and the second bridge arm unit each includes at least two power transistors having a body diode, the first bridge arm unit is configured to generate a first pulse signal based on the DC power and the second bridge arm unit is configured to generate a second pulse signal based on the DC power; the first pulse signal and the second pulse signal have a same waveform with a phase difference; the phase difference is greater than a dead time of each bridge arm unit and is less than half of a switching period of the first pulse signal or the second pulse signal; the inverting coupling transformer includes a first winding and a second winding coupled to each other; a homopolar end of the first winding is connected to the first bridge arm unit to access the first pulse signal; a heteropolar end of the second winding is connected to the second bridge arm unit to access the second pulse signal; a heteropolar end of the first winding is connected to a homopolar end of the second winding and is an output terminal of the non-interleaved inverter circuit for outputting the AC voltage; the inverting coupling transformer is configured to form a current loop with the first bridge arm unit and the second bridge arm unit so that the body diode conducts before a corresponding power transistor conducts.

In one embodiment, the first bridge arm unit includes a first power transistor and a second power transistor, and the second bridge arm unit includes a third power transistor and a fourth power transistor; a first conduction end of the first power transistor is connected to a positive output of the DC power supply, and a second conduction end of the first power transistor is connected to a first conduction end of the second power transistor and to the homopolar end of the first winding, a second conducting end of the second power transistor is connected to a negative output of the DC power supply; a first conducting end of the third power transistor is connected to the positive output of the DC power supply, a second conducting end of the third power transistor is connected to a first conducting end of the fourth power transistor and to the heteropolar end of the second winding, a second conducting end of the fourth power transistor is connected to the negative output of the DC power supply.

In one embodiment, the non-interleaved inverter circuit further includes a filter inductor, the filter inductor is connected to the inverting coupling transformer, so that the inverting coupling transformer outputs the AC voltage through the filter inductor.

In one embodiment, two non-interleaved inverter circuits are provided for generating the target AC power based on the AC voltage output from the two non-interleaved inverter circuits; the multiphase inverter circuit further includes an output filter capacitor and a load resistor, the output filter capacitor and the load resistor are connected between output terminals of the two non-interleaved inverter circuits.

In one embodiment, further provided is a first regulation switch, the first regulation switch is connected between the output terminals of the two non-interleaved inverter circuits.

In one embodiment, further provided is a second regulation switch, the second regulation switch is connected between the positive output of the DC power supply and each of the two non-interleaved inverter circuits.

In one embodiment, three non-interleaved inverter circuits are provided for generating the target AC voltage based on the AC voltage output from the three non-interleaved inverter circuits; the output terminal of each of the three non-interleaved inverter circuits is respectively grounded through a corresponding output filter capacitor.

In one embodiment, further provided is a power supply filter capacitor, the power supply filter capacitor is connected between the positive output and the negative output.

In one embodiment, further provided is a control circuit, the control circuit includes a voltage detection module, a current detection module, a logic operation module, and a driver module, the voltage detection module is connected to the current detection module, the current detection module is connected to the logic operation module, and the logic operation module is connected to each power transistor in the multiphase inverter circuit through the driver module; the voltage detection module and the current detection module are configured to correspondingly generate a first feedback signal and a second feedback signal based on a sampled voltage and a sampled current of the target AC power, respectively, and the logical operation module is configured to control the driver module to output a corresponding drive voltage to the each power transistor based on the first feedback signal and the second feedback signal.

A second aspect of an embodiment of the present application provides a modulation method applied to the above-mentioned multiphase inverter circuit, and the modulation method includes: generating and outputting to the first bridge arm unit a first upper bridge arm drive voltage and a first lower bridge arm drive voltage for driving the first bridge arm unit to generate the first pulse signal, where a signal of the first upper bridge arm drive voltage and a signal of the first lower bridge arm drive voltage have opposite polarities, and a high level of the first upper bridge arm drive voltage and a high level of the first lower bridge arm drive voltage have a corresponding dead time therebetween; generating and outputting to the second bridge arm unit a second upper bridge arm drive voltage and a second lower bridge arm drive voltage for driving the second bridge arm unit to generate the second pulse signal; where a signal of the second upper bridge arm drive voltage and a signal of the second lower bridge arm drive voltage have opposite polarities, and a high level of the second upper bridge arm drive voltage and a high level of the second lower bridge arm drive voltage have a corresponding dead time therebetween; the first upper bridge arm drive voltage and the second upper bridge arm drive voltage have a same waveform with the phase difference, and the first lower bridge arm drive voltage and the second lower bridge arm drive voltage have a same waveform with the phase difference.

The beneficial effect of the embodiments of the present application compared with the existing technology is that when the first pulse signal and the second pulse signal with phase difference pass through the inverting coupling transformer, the present application can form a current loop within the non-interleaved inverter circuit so that the body diode of the power transistor conducts first before the power transistor conducts, thereby reducing the reverse recovery power consumption of the body diode of the corresponding power transistor and realizing zero-voltage soft switching (ZVS).

BRIEF DESCRIPTION OF THE DRAWINGS

FIG. 10 is a ninth schematic diagram of the structure of the multiphase inverter circuit provided in an embodiment of the present application; and FIG. 11 is a flowchart of the modulation method provided in an embodiment of the present application.

Figure 1:
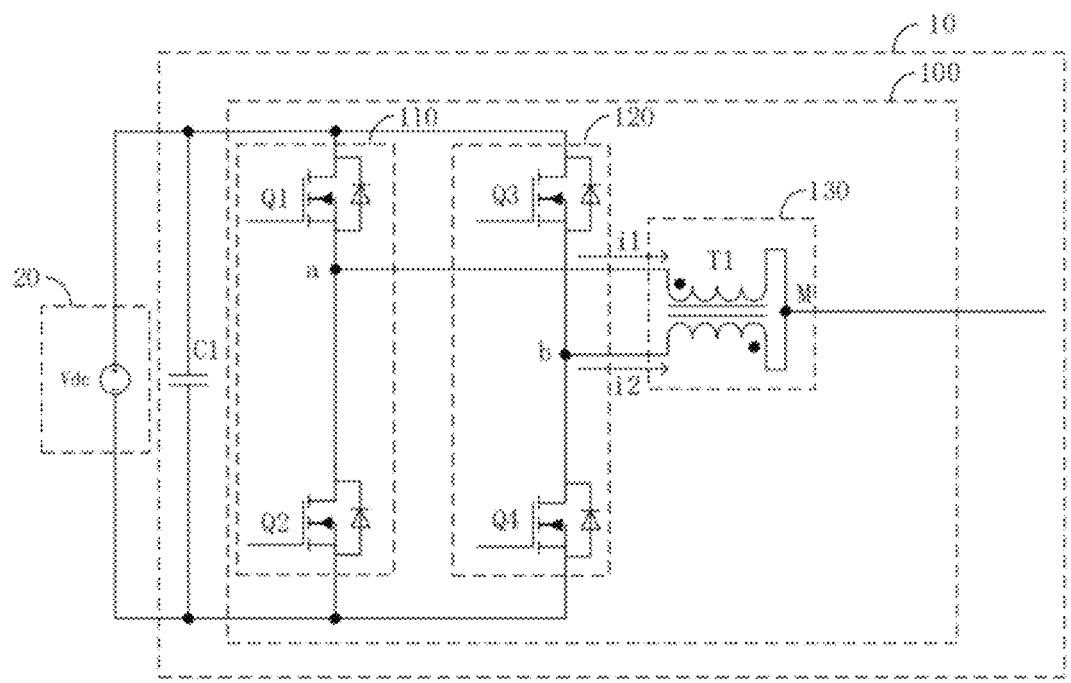
FIG. 1 is a first schematic diagram of the structure of the multiphase inverter circuit provided in an embodiment of the present application.

Reference numbers in the drawings are as follows:

10, multiphase inverter circuit; 20, DC power supply; 100, non-interleaved inverter circuit; 110, first bridge arm unit; 120, second bridge arm unit; 130, inverting coupling transformer; 200, switch bridge arm circuit; 300, control circuit; 310, voltage detection module; 320, current detection module; 330, logic operation module; and 340, driver module.

DETAILED DESCRIPTION OF THE EMBODIMENTS

In order to make the technical problem to be solved, technical proposals, and beneficial effects in the present application clearer, the present application will be described in further detail in conjunction with the embodiments. It should be understood that the specific embodiments described here are only used to explain the present application, not to limit the present application.

It is noted that when an element is referred to as being "fixed to" or "disposed on" another element, it may be directly on the other element or indirectly on the other element. When an element is referred to as being "connected to" another element, it may be directly connected to the other element or indirectly connected to the other element.

It is understood that the terms "length", "width", "upper", "lower", "front", "rear", "left", "right", "vertical", "horizontal", "top", "bottom", "inside", "outside", etc. indicating an orientation or positional relationship are based on the orientation or positional relationship shown in the accompanying drawings and are intended only to facilitate and simplify the description of the application, not to indicate or imply that the device or element referred to must have a particular orientation, be constructed and operate in a particular orientation, and therefore are not to be construed as limiting the application.

In addition, the terms "first" and "second" are used for descriptive purposes only and are not to be construed as indicating or implying relative importance or implicitly specifying the number of technical features indicated. Thus, the features qualified with "first" and "second" may explicitly or implicitly include one or more such features. In the description of the present application, "a plurality of" means two or more, unless otherwise expressly and specifically limited.

FIG. 1 is a first schematic diagram of the structure of the multiphase inverter circuit provided in an embodiment of the present application, as detailed below.

A multiphase inverter circuit 10 for generating a target AC power based on DC power provided by a DC power supply 20, the multiphase inverter circuit 10 includes at least one non-interleaved inverter circuit 100. The DC voltage of the DC power supply 20 is set to Vdc.

Each non-interleaved inverter circuit 100 is used to output an AC voltage corresponding to a phase, and the target AC power includes the AC voltage. The non-interleaved inverter circuit 100 includes: a first bridge arm unit 110, a second bridge arm unit 120, and an inverting coupling transformer 130.

Both the first bridge arm unit 110 and the second bridge arm unit 120 include at least two power transistors having a body diode, and the first bridge arm unit 110 is configured to generate a first pulse signal based on a direct current and the second bridge arm unit 120 is configured to generate a second pulse signal based on a direct current. The waveforms of the first pulse signal and the second pulse signal are the same with a phase difference. The phase difference is greater than a dead time of each bridge arm unit and less than half of a switching period of the first pulse signal or the second pulse signal. The inverting coupling transformer 130 includes a first winding and a second winding that are coupled to each other. A homopolar end of the first winding is connected to the first bridge arm unit 110 to access the first pulse signal. A heteropolar end of the second winding is connected to the second bridge arm unit 120 to access the second pulse signal. A heteropolar end of the first winding is connected to a homopolar end of the second winding and is an output midpoint M of the inverting coupling transformer 130. The output midpoint M can be used as an output terminal of the non-interleaved inverter circuit 100 for outputting AC voltage; the inverting coupling transformer 130 is also used to form a current circuit with the first bridge arm unit 110 and the second bridge arm unit 120 so that the body diode of the respective power transistors conducts before the corresponding power transistor conducts. The first pulse signal and the second pulse signal are both high-frequency square wave signals. The power transistors may adopt fully controlled power semiconductor devices such as metal-oxide-semiconductor field-effect transistors (MOSFET) and insulated gate bipolar transistors (IGBT), and may also use third-generation semiconductor wide bandgap (WBG) power devices such as silicon carbide (SiC) MOSFETs, gallium nitride (GaN) MOSFETs, and the like. The type of multiphase inverter circuit 10 is not limited and may be configured according to actual requirements. For example, the multiphase inverter circuit 10 may be any kind of inverter circuit such as a full-bridge inverter circuit, a half-bridge inverter circuit, a three-phase inverter circuit, and the like. The multiphase inverter circuit 10 includes at least one non-interleaved inverter circuit 100 for outputting at least one of the phases of the AC voltage.

When the first pulse signal and the second pulse signal with a phase difference pass through the inverting coupling transformer 130, a current loop can be formed through the corresponding power transistor body diodes before each power transistor in the non-interleaved inverter circuit 100 is turned on, so that the body diodes of the power transistors are turned on first, thus reducing the reverse recovery power consumption of the body diodes of the corresponding power transistors, realizing zero-voltage soft switching, and improving conversion efficiency.

At the same time, the switching power consumption of each power transistor is low, so that each power transistor can operate at a higher switching frequency. The two bridge arm circuits have at least four power transistors in total, and each power transistor shares a smaller current, making the heat generated by the two bridge arm circuits smaller and more evenly distributed, improving the reliability of the inverter circuit.

It should be noted that a modulation method of the first bridge arm unit 110 and the second bridge arm unit 120 is the modulation method of phase shifting interleaved phase $\Phi \neq 360°/N$, where N is the number of corresponding bridge arm units and $\Phi$ is the phase difference, in one embodiment N is 2, then $\Phi \neq 360°/2$, where the phase difference may be in a range of $\Phi < 0.5Ts$, Ts is the pulse signal switching period. Specifically, when $D > 0.5$, $\Phi < (1-D)*Ts$; and when $D < 0.5$, $\Phi < D*Ts$, where D is the duty cycle of the pulse signal.

Exemplarily, as shown in FIG. 1, the first bridge arm unit 110 includes a first power transistor Q1 and a second power transistor Q2, and the second bridge arm unit 120 includes a third power transistor Q3 and a fourth power transistor Q4. The first power transistor Q1, the second power transistor Q2, the third power transistor Q3, and the fourth power transistor Q4 are all N-type MOS transistors, and a first conduction end of each power transistor corresponds to a drain of the N-type MOS transistor, a second conduction end of each power transistor corresponds to a source of the N-type MOS transistor, and a controlled end of each power transistor corresponds to a gate of the N-type MOS transistor, and the controlled end is configured to receive a corresponding drive voltage.

The first conduction end of the first power transistor Q1 is connected to the positive output terminal of the DC power supply 20, the second conduction end of the first power transistor Q1 is connected to the first conduction end of the second power transistor Q2 and the homopolar end of the first winding, and the second conduction end of the second power transistor Q2 is connected to the negative output terminal of the DC power supply 20.

The first conduction end of the third power transistor Q3 is connected to the positive output terminal of the DC power supply 20, the second conduction end of the third power transistor Q3 is connected to the first conduction end of the fourth power transistor Q4 and the heteropolar end of the second winding, and the second conduction end of the fourth power transistor Q4 is connected to the negative output terminal of the DC power supply 20.

A connection point between the second conduction end of the first power transistor Q1 and the first conduction end of the second power transistor Q2 is the first bridge arm output midpoint a, and the connection point between the second conduction end of the third power transistor Q3 and the first conduction end of the fourth power transistor Q4 is the second bridge arm output midpoint b.

Figure 2:
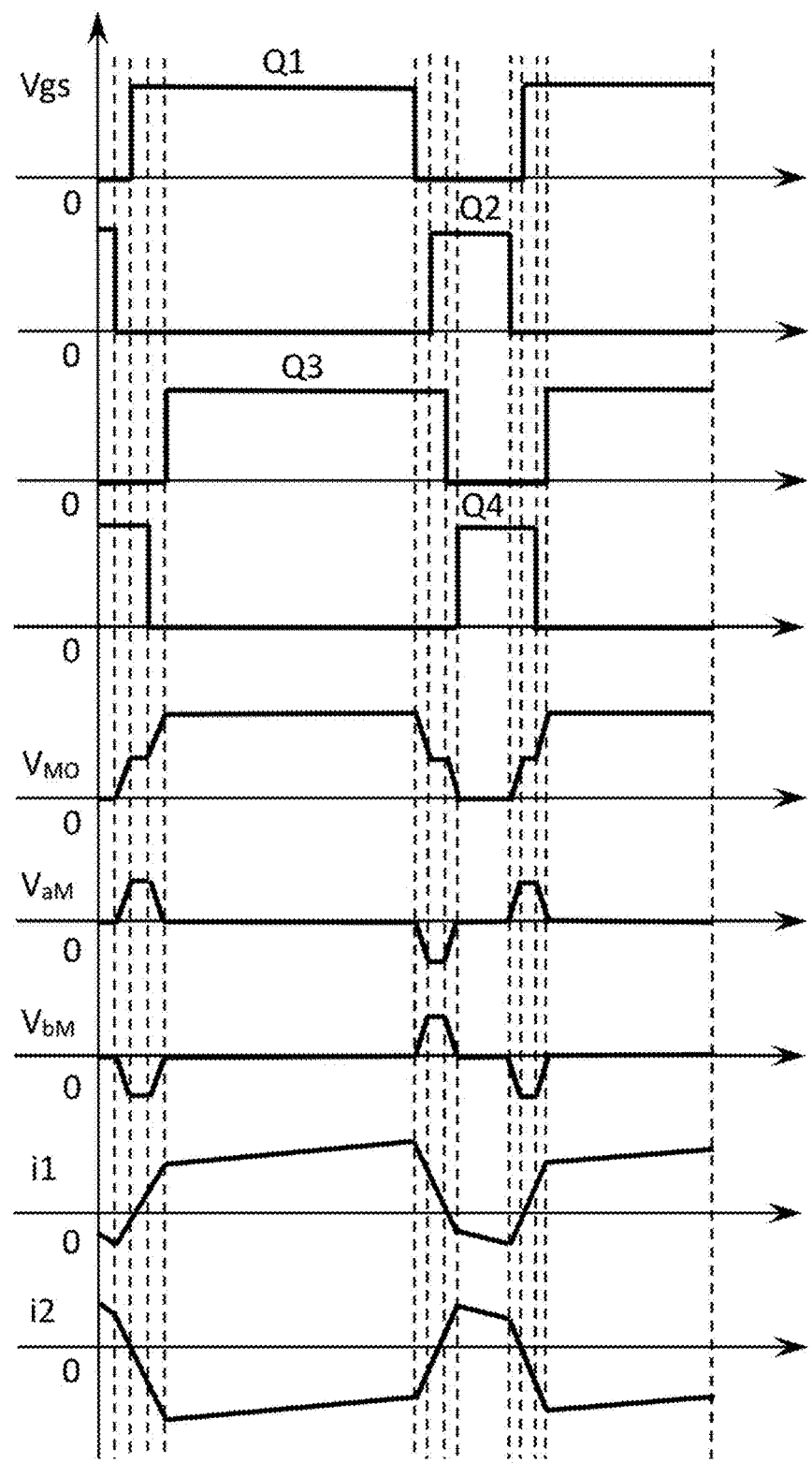
FIG. 2 shows the voltage waveforms or corresponding current waveforms between the significant ends in the circuit shown in FIG. 1.

FIG. 2 shows the voltage waveforms or corresponding current waveforms between the important terminals in the circuit of FIG. 1. Where Vgs is the drive voltage of each power transistor, $V_{M0}$ is a voltage at the output midpoint M of the inverting coupling transformer 130, $V_{aM}$ is a voltage from the output midpoint a of the first bridge arm to the output midpoint M of the inverting coupling transformer 130, $V_{bM}$ is a voltage from the output midpoint b of the second bridge arm to the output midpoint M of the inverting coupling transformer 130, i1 is a current flowing from the first bridge arm output midpoint a to the inverting coupling transformer 130, and i2 is a current flowing from the second bridge arm output midpoint b to the inverting coupling transformer 130.

The drive voltage of the first power transistor Q1 is of an opposite polarity to the drive voltage of the second power transistor Q2, the drive voltage of the third power transistor Q3 is of an opposite polarity to the drive voltage of the fourth power transistor Q4, and the duty cycle of the drive voltage of the first power transistor Q1 and the drive voltage of the third power transistor Q3 are both greater than 0.5. Since the first pulse signal and the second pulse signal have the same waveform and a phase difference, accordingly, the drive voltage of the first power transistor Q1 and the drive voltage of the third power transistor Q3 have the same waveform and the corresponding phase difference, and the drive voltage of the second power transistor Q2 and the drive voltage of the fourth power transistor Q4 have the same waveform and the corresponding phase difference. At the same time, in conventional techniques, the drive voltages of the two power transistors of the same bridge arm unit have a dead time, i.e., there is a dead time between the high levels of the drive voltage of the first power transistor Q1 and the drive voltage of the second power transistor Q2, and there is a dead time between the high levels of the drive voltage of the third power transistor Q3 and the drive voltage of the fourth power transistor Q4, so the phase difference needs to be greater than the dead time. Exemplarily, the phase difference between the first pulse signal and the second pulse signal is twice the dead time.

During the dead time before the first power transistor Q1 is on, i.e., when both the first power transistor Q1 and the second power transistor Q2 are off, only the fourth power transistor Q4 is still on at this time due to the phase difference, and the voltage $V_{aM}$ rises from 0 and the voltage $V_{bM}$ falls from 0. The current i1 is negative and rises linearly, and the current i2 is positive and declines linearly, so that at the time when the first power transistor Q1 switches from off to on (i.e., when the drive voltage of the first power transistor Q1 changes from low to high), the body diode of the first power transistor Q1 is already on, thus achieving a zero-voltage conduction of the first power transistor Q1.

When the first power transistor Q1 and the fourth power transistor Q4 are simultaneously on, $V_{M0}=\frac{1}{2}*Vdc$, $V_{aM}=\frac{1}{2}*Vdc$, and $V_{bM}=-\frac{1}{2}*Vdc$, the current i1 rises linearly and the current i2 declines linearly.

During the dead time of the second bridge arm circuit before the third power transistor Q3 is on, only the first power transistor Q1 is on, when the voltage $V_{aM}$ starts to fall and the voltage $V_{bM}$ starts to rise, the current i1 is positive and rises linearly, and the current i2 is negative and declines linearly, so that the body diode of the third power transistor Q3 is already on when the third power transistor Q3 switches from off to on, thus achieving a zero-voltage conduction of the third power transistor Q3.

When the first power transistor Q1 and the third power transistor Q3 are simultaneously on, $V_{M0}=Vdc$, $V_{aM}=0$ and $V_{bM}=0$, and due to leakage inductance, the current i1 is positive and continues to rise slightly, and the current i2 is negative and rises slightly in the reverse direction.

During the dead time before the second power transistor Q2 is switched on, only the third power transistor Q3 is still on, when the voltage $V_{aM}$ falls from 0, the voltage $V_{bM}$ rises from 0, the current i1 is positive and linearly declines, and the current i2 is negative and linearly rises, so that the body diode of the second power transistor Q2 is already on when the second power transistor Q2 switches from off to on, thus achieving a zero-voltage conduction of the second power transistor Q2.

When the second power transistor Q2 and the third power transistor Q3 are simultaneously on, $V_{M0}=\frac{1}{2}*Vdc$, $V_{aM}=-\frac{1}{2}*Vdc$, and $V_{bM}=\frac{1}{2}*Vdc$, current i1 falls linearly, and current i2 rises linearly.

During the dead time of the second bridge arm circuit before the fourth power transistor Q4 is switched on, only the second power transistor Q2 is on, when the voltage $V_{aM}$ starts to rise and the voltage $V_{bM}$ starts to fall, the current i1 is negative and linearly declines, and the current i2 is positive and linearly rises, so that the body diode of the fourth power transistor Q4 is already on when the fourth power transistor Q4 switches from off to on, thus achieving a zero-voltage conduction of the fourth power transistor Q4.

When the second power transistor Q2 and the fourth power transistor Q4 are simultaneously on, $V_{M0}=0$, $V_{aM}=0$, and $V_{bM}=0$, the current i1 decreases slightly in the reverse direction and the current i2 continues to drop slightly due to leakage inductance.

In summary, the current i1 is negative before the first power transistor Q1 is on; the current i1 is positive before the second power transistor Q2 is on; the current i2 is negative before the third power transistor Q3 is on; and the current i2 is negative before the fourth power transistor Q4 is on. Thereby, the current loop generated by the inverting coupling transformer 130 can switch on each body diode first before the individual power transistor is switched on, thereby reducing or even eliminating the reverse recovery power consumption of the body diode of each power transistor and achieving zero-voltage turn conduction. In addition, zero-voltage disconnection can be nearly achieved by the parasitic capacitance between the first conduction end and the second conduction end of each power transistor, or the small capacitance incorporated outside each power transistor. By the above modulation method, a better equalization of current and heat can be achieved.

As shown in FIG. 2, in one embodiment, the voltage $V_{M0}$ is a three-level output with high power quality and low output harmonics, thus there is no need for an additional filter inductor L1, thereby reducing the circuit size and cost.

Figure 3:
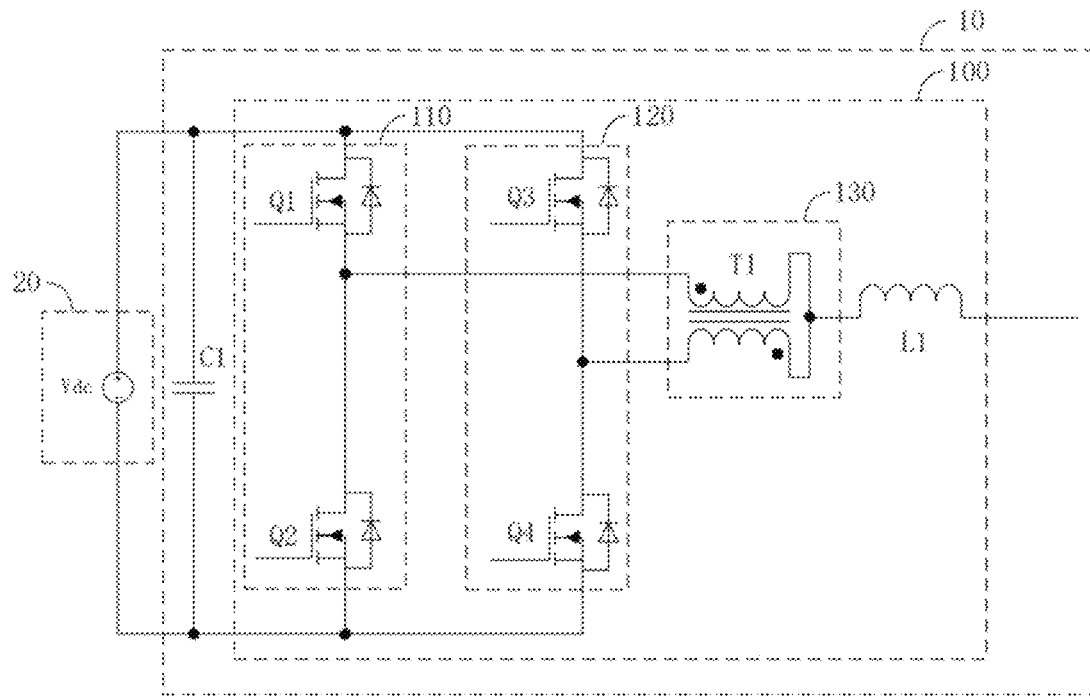
FIG. 3 is a second schematic diagram of the structure of the multiphase inverter circuit provided in an embodiment of the present application.

In one embodiment, the non-interleaved inverter circuit 100 also includes a filter inductor L1, as shown in FIG. 3. The filter inductor L1 is connected to the inverting coupling transformer 130, and the inverting coupling transformer 130 outputs an AC voltage through the filter inductor L1, and the filter inductor L1 is configured to optimize the waveform of the AC voltage. Specifically, a first end of the filter inductor L1 is connected to the output midpoint M of the inverting coupling transformer 130, and a second end of the filter inductor L1 is configured to output the optimized AC voltage, at which point the second end of the filter inductor L1 is the output terminal of the non-interleaved inverter circuit 100.

Figure 4:
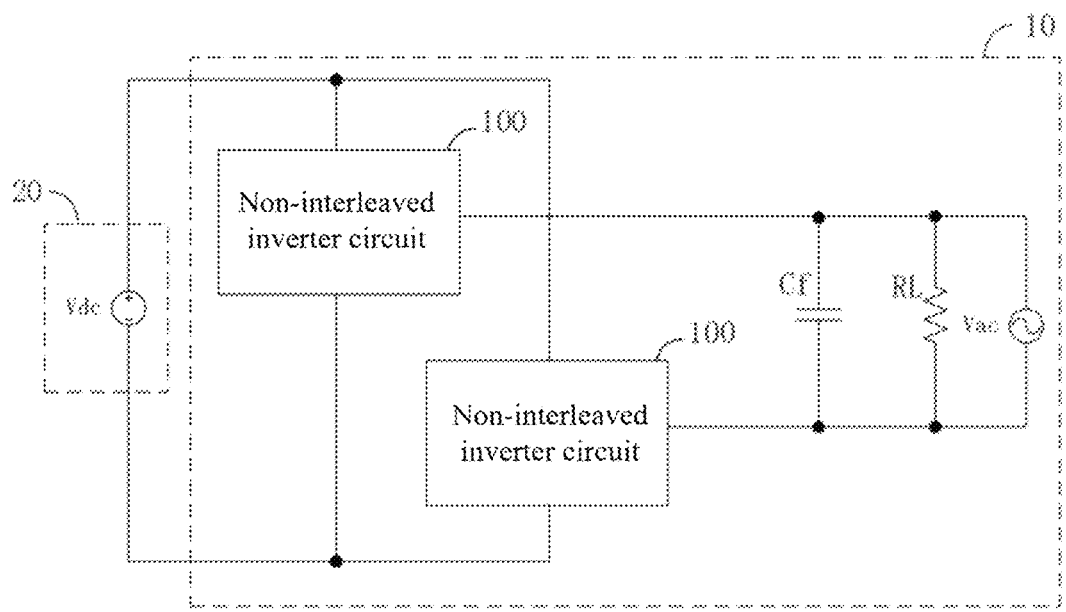
FIG. 4 is a third schematic diagram of the structure of the multiphase inverter circuit provided in an embodiment of the present application.

In one embodiment, as shown in FIG. 4, the multiphase inverter circuit 10 includes two non-interleaved inverter circuits 100 for generating a target AC power based on the AC voltage output from the two non-interleaved inverter circuits 100. The non-interleaved inverter circuits 100 may be controlled in either a bipolar or unipolar manner.

The multiphase inverter circuit 10 also includes an output filtering capacitor Cf and a load resistor RL, both connected between the output terminals of the two non-interleaved inverter circuits 100. After the AC voltage output from the two non-interleaved inverter circuits 100 is filtered by the output filter capacitor Cf, the load resistor RL generates a corresponding target AC power at both ends of the load resistor RL.

Figure 5:
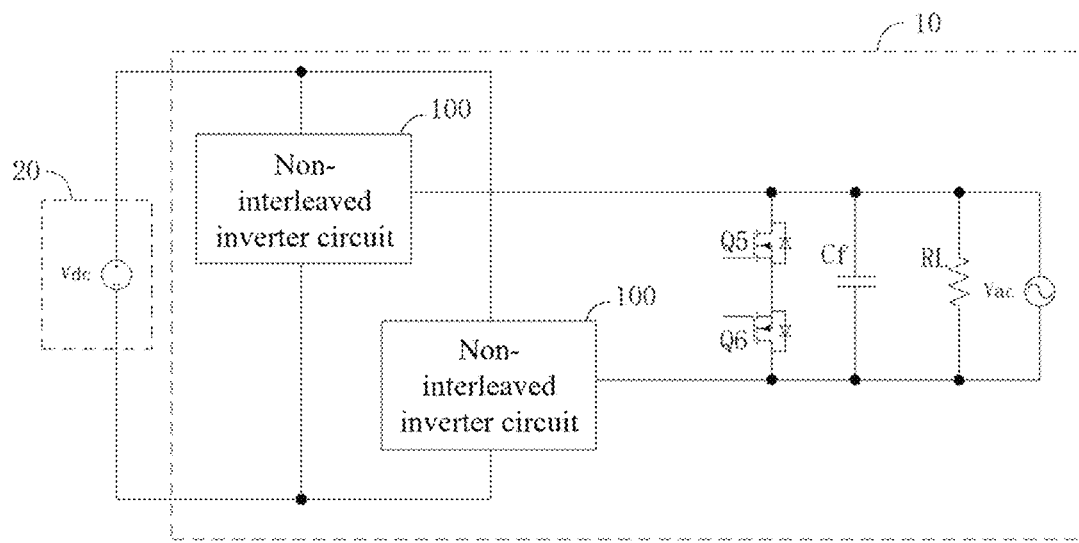
FIG. 5 is a fourth schematic diagram of the structure of the multiphase inverter circuit provided in an embodiment of the present application.

In one embodiment, the multiphase inverter circuit 10 also includes a first regulation switch, which can be a bidirectional switch, as shown in FIG. 5, and the first regulation switch is connected between the output terminals of the two non-interleaved inverter circuits 100. The first regulation switch allows the multiphase inverter circuit 10 to be turned into a highly efficient reliable inverter concept (HERIC), thereby reducing the common-mode interference and leakage current of the multiphase inverter circuit 10, and also enabling a multilevel operation. Exemplarily, as shown in FIG. 5, the first regulation switch may include a power transistor Q5 and a power transistor Q6 connected in series.

Figure 6:
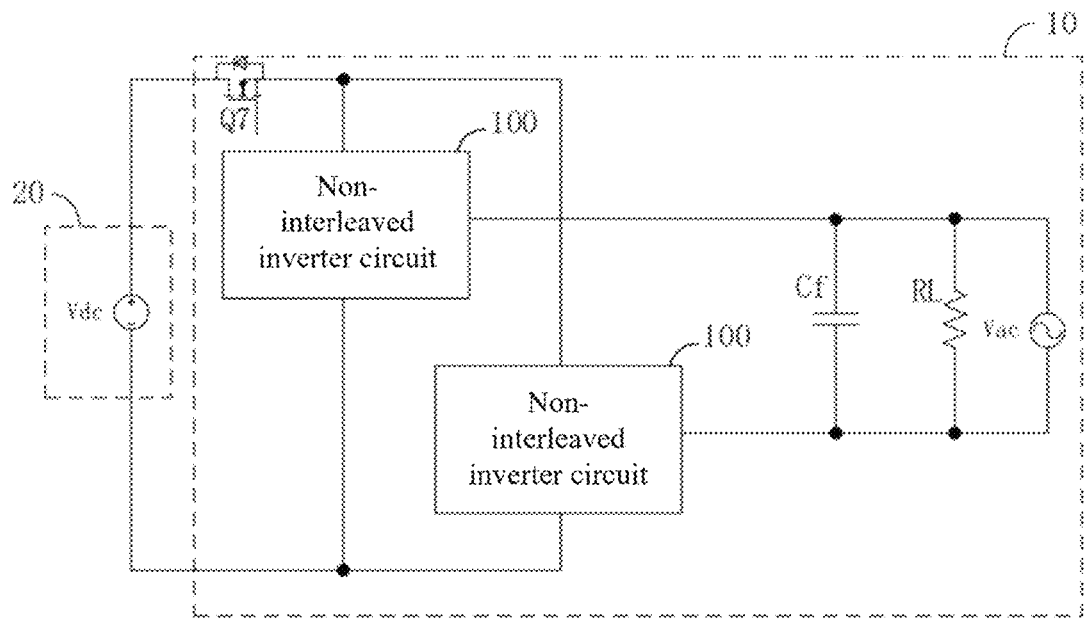
FIG. 6 is a fifth schematic diagram of the structure of the multiphase inverter circuit provided in an embodiment of the present application.

In one embodiment, the multiphase inverter circuit 10 also includes a second regulation switch Q7, which is connected between the positive output terminal of the DC power supply 20 and each of the non-interleaved inverter circuits 100, as shown in FIG. 6. The second regulation switch Q7 allows the multiphase inverter circuit 10 to become an inverter circuit with H5 topology, which can reduce the common-mode interference and leakage current of the multiphase inverter circuit 10.

Figure 7:
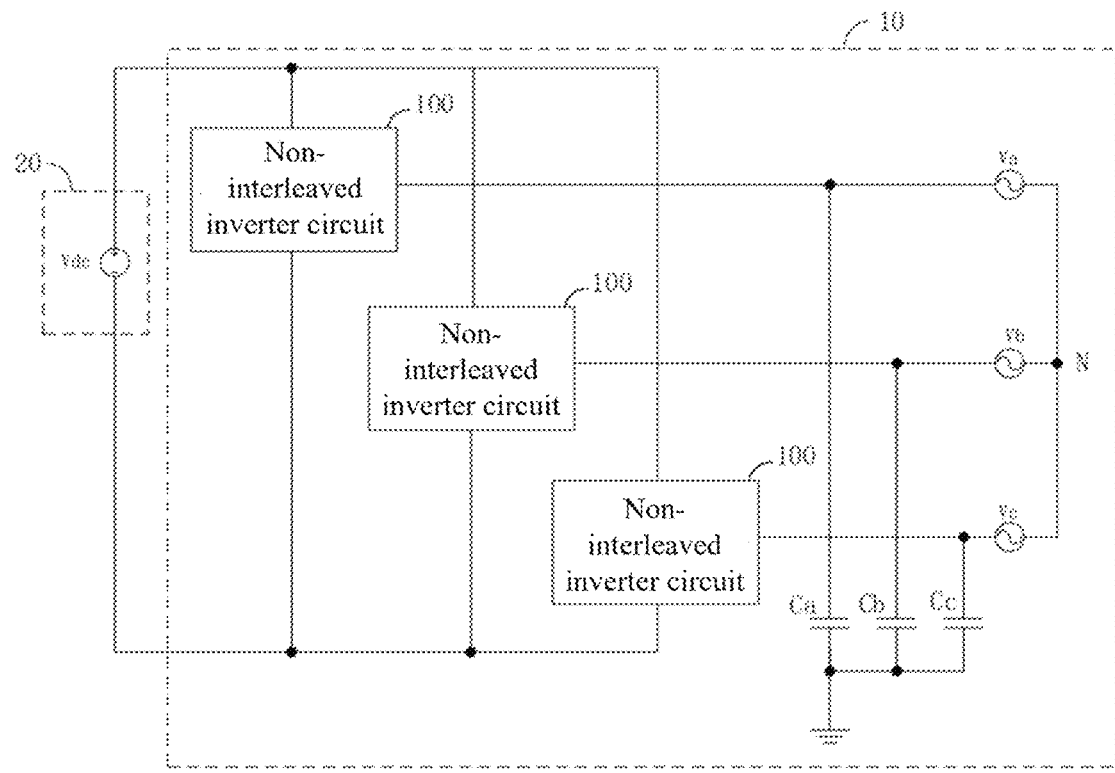
FIG. 7 is a sixth schematic diagram of the structure of the multiphase inverter circuit provided in an embodiment of the present application.

In one embodiment, the multiphase inverter circuit 10 includes three non-interleaved inverter circuits 100 for generating a target AC voltage based on the AC voltage output from the three non-interleaved inverter circuits 100. As shown in FIG. 7, the three non-interleaved inverter circuits 100 can form a three-phase inverter circuit with each non-interleaved inverter circuit 100 outputting a voltage Va, a voltage Vb, and a voltage Vc, respectively, to generate a three-phase voltage.

The output midpoint M of the inverting coupling transformer 130 of each non-interleaved inverter circuit 100 is grounded through a corresponding filter capacitor, respectively.

Figure 8:
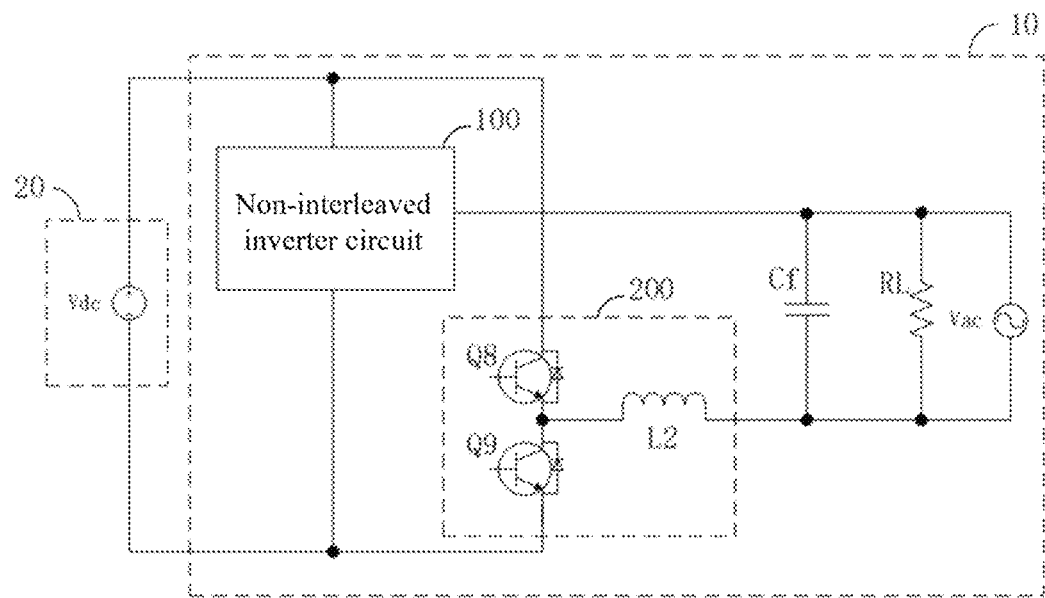
FIG. 8 is a seventh schematic diagram of the structure of the multiphase inverter circuit provided in an embodiment of the present application.

In one embodiment, the multiphase inverter circuit 10 includes a switch bridge arm circuit 200 configured to generate an AC voltage corresponding to a phase based on the DC. Exemplarily, as shown in FIG. 8, the multiphase inverter circuit 10 includes a switch bridge arm circuit 200 and a non-interleaved inverter circuit 100, the switch bridge arm circuit 200 specifically includes a fifth power transistor Q8, a sixth power transistor Q9, and a filter inductor L2, a first conduction end of the fifth power transistor Q8 is connected to the positive output terminal of the DC power supply 20, a second conduction end of the fifth power transistor Q8 is connected to a first conduction end of the sixth power transistor Q9 and a first end of the filter inductor L2, and a second end of the filter inductor L2 is configured to output the corresponding AC voltage, thereby cooperating with the non-interleaved inverter circuit 100 to generate a target AC power. The fifth power transistor Q8 and the sixth power transistor Q9 may be IGBT tubes. The switch bridge arm circuit 200 may be controlled in a unipolar manner and the non-interleaved inverter circuit 100 may be controlled in a bipolar manner.

In one embodiment, the multiphase inverter circuit 10 also includes a power supply filter capacitor C1, as shown in FIG. 1. The power supply filter capacitor C1 is connected between the positive output terminal of the DC power supply 20 and the negative output terminal of the DC power supply 20. The power supply filter capacitor C1 is configured to filter the AC power signal.

Figure 9:
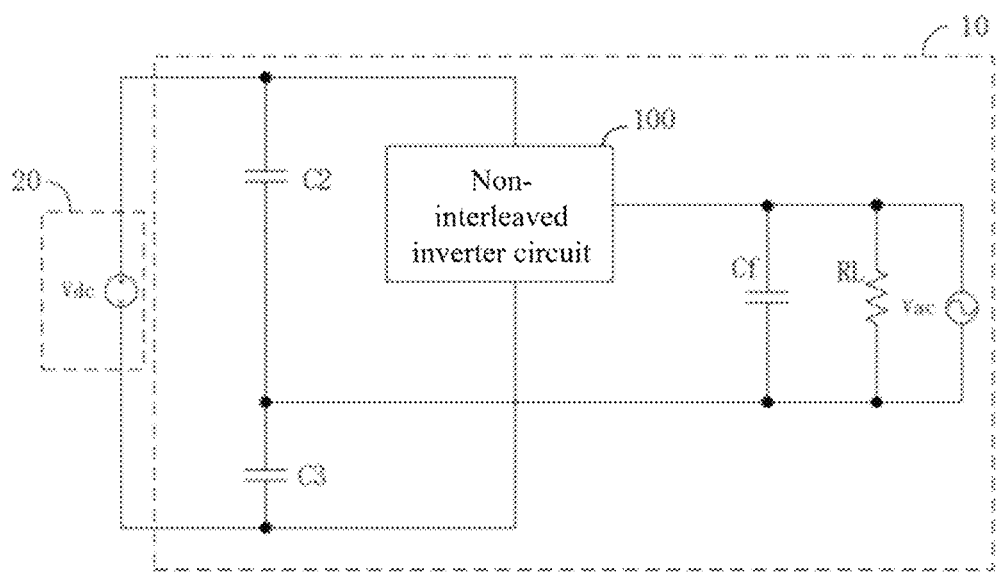
FIG. 9 is an eighth schematic diagram of the structure of the multiphase inverter circuit provided in an embodiment of the present application.

In one embodiment, the multiphase inverter circuit 10 also includes two voltage divider capacitors connected in series, as shown in FIG. 9, specifically a voltage divider capacitor C2 and a voltage divider capacitor C3. The connection points of the two voltage divider capacitors can be connected to an external circuit or load so that a half-bridge inverter circuit can be formed with a non-interleaved inverter circuit 100. The cost of the capacitors is lower than that of the power transistors. The non-interleaved inverter circuit 100 may be controlled in a bipolar manner.

In one embodiment, the multiphase inverter circuit 10 further includes a control circuit 300 configured to generate a drive voltage based on the target AC power, the drive voltage is configured to control the on and off of each power transistor in the multiphase inverter circuit 10.

In one embodiment, the control circuit 300 includes a voltage detection module 310, a current detection module 320, a logic operation module 330, and a driver module 340. The voltage detection module 310 and the current detection module 320 are configured to generate a corresponding first feedback signal and second feedback signal based on a sampling voltage and a sampling current of the target AC power, respectively. The voltage detection module 310 is connected to the current detection module 320, the current detection module 320 is connected to the logic operation module 330, and the logic operation module 330 is connected to each power transistor through the driver module 340. The logic operation module 330 is configured to control the driver module 340 to output a corresponding drive voltage to each power transistor based on the sampling voltage and the sampling current.

Exemplarily, as shown in FIG. 10, the multiphase inverter circuit 10 includes two non-interleaved inverter circuits 100. The voltage detection module 310 includes a first operational amplifier unit U1, a first sampling resistor R1, and a second sampling resistor R2, and the current detection module 320 includes a second operational amplifier unit U3. The logic operation module 330 and the driver module 340 can be built using discrete electronic components, or can be designed and used dedicated integrated circuits, such as analog control chips, microcontrollers (MCU) programmed by software, digital signal processors (DSP) or programmable logic devices (FPGA/CPLD), etc.

A first end of the first sampling resistor R1 is connected to the output midpoint M of one of the non-interleaved inverter circuits 100, a second end of the first sampling resistor R1 is grounded through the second sampling resistor R2, and the second end of the first sampling resistor R1 is connected to an inverting input of the first operational amplifier unit U1 to collect the sampling voltage. A non-inverting input of the first operational amplifier unit U1 is connected to a reference voltage source Vr, an output of the first operational amplifier unit U1 is connected to a negative terminal of a primary diode of a photocoupler U2. The first opto-amp unit U1 is configured to generate and output a first feedback signal through the output based on the electrical signals at the inverting input and non-inverting input, and the positive terminal and the negative terminal of the primary diode are connected to the internal power supply. An emitter of a secondary triode of the photocoupler U2 is grounded, and a collector of the secondary triode is connected to the non-inverting input of the second operational amplifier unit U3 and the reference current source Is, and the inverting input of the second operational amplifier unit U3 is connected to the output midpoint M of one of the non-interleaved inverter circuits 100 through a current collection device to collect the sampling current. The current collection device can be a current sensor, a current transformer, or a resistor, the output of the second operational amplifier unit U3 is connected to the logic operation module 330, the second operational amplifier unit U3 is configured to generate and output a second feedback signal through its output based on the electrical signals at its inverting input and non-inverting input. The logic operation module 330 can obtain the parameters of the target AC power based on the second feedback signal, determine whether the voltage and current of the current output target AC power are equal to the preset parameters, and then adjust the drive voltage output by the driver module 340.

It should be noted that the voltage detection module 310 can adjust the output voltage and achieve voltage stabilization through the corresponding voltage outer-loop proportional integration (PI) compensation design. The current detection module 320 can be designed by the corresponding current inner-loop proportional integration (PI) compensation, and can be controlled by the average current mode or the peak current mode, thus improving the dynamic response performance of the multiphase inverter circuit 10. The first operational amplifier unit U1 and the second operational amplifier unit U3 may adopt second-order or multi-order outer-loop proportional integral compensation or other intelligent control methods. Optionally, the logic operation module 330 can employ various types of control methods, such as quasi-resonant control, single-switch cycle control, continuous current mode (CCM), discontinuous current mode (DCM), critical current mode (CRM), etc.

The multiphase inverter circuit 10 may be either discrete or integrated, or it can be integrated into the controller to form a large-scale hybrid integrated circuit, and this highly integrated controller design can further reduce the inverter size.

FIG. 11 illustrates a flow chart of the modulation method provided in an embodiment of the present application, as detailed below:

A modulation method that can be applied to the multiphase inverter circuit 10 in any of the above-mentioned embodiments, the modulation method includes steps S100 to S200:

In step S100, the first upper bridge arm drive voltage and the first lower bridge arm drive voltage are generated and output to the first bridge arm unit 110 for driving the first bridge arm unit 110 to generate the first pulse signal. The signals of the first upper bridge arm drive voltage and the first lower bridge arm drive voltage have opposite polarity, and a corresponding dead time is provided between the high level of the first upper bridge arm drive voltage and the first lower bridge arm drive voltage.

In step S200, a second upper bridge arm drive voltage and a second lower bridge arm drive voltage are generated and output to the second bridge arm unit 120 for driving the second bridge arm unit 120 to generate a second pulse signal. The signals of the second upper bridge arm drive voltage and the second lower bridge arm drive voltage have opposite polarity, and there is a corresponding dead time between the high level of the second upper bridge arm drive voltage and the second lower bridge arm drive voltage.

The first upper bridge arm drive voltage and the second upper bridge arm drive voltage have the same waveforms with a phase difference therebetween, and the first lower bridge arm drive voltage and the second lower bridge arm drive voltage have the same waveforms with a phase difference therebetween. The dead time between the high level of the first upper bridge arm drive voltage and the first lower bridge arm drive voltage is equal to the dead time between the high level of the second upper bridge arm drive voltage and the second lower bridge arm drive voltage, and the switching periods of respective drive voltages are the same.

In one embodiment, the phase difference is greater than the dead time of each bridge arm unit and less than half of the switching period of each drive voltage. Specifically, the phase difference may be equal to twice the dead time.

Taking one of the embodiments of the non-interleaved inverter circuit 100 as an example, as shown in FIGS. 1 and 2, the first upper bridge arm drive voltage is the drive voltage supplied to the first power transistor Q1, the first lower bridge arm drive voltage is the drive voltage supplied to the second power transistor Q2, the second upper bridge arm drive voltage is the drive voltage supplied to the third power transistor Q3, and the second lower bridge arm drive voltage is the drive voltage supplied to the fourth power transistor Q4.

The logic operation module 330 of any of the above embodiments can perform the above modulation method through the driver module 340 to output the corresponding drive voltage to each bridge arm unit.

It should be understood that the sequence of the steps in the above embodiments does not imply the order of execution, and the order of execution of the processes should be determined by their function and inherent logic, and should not constitute any limitation to the process of implementation of the embodiments of the present application. Step S100 and step S200 may be performed simultaneously.

Those skilled in the art can clearly understand that for the convenience and brevity of description, the division of the above-mentioned functional units and modules is only used as an example for illustration. In practical applications, the above-mentioned functions can be assigned to different functional units and modules as needed, i.e., the internal structure of the device is divided into different functional units or modules to accomplish all or some of the above-mentioned functions. Each functional unit and module in the embodiments can be integrated into one processing unit, or each unit can exist separately physically, or two or more units can be integrated into one unit, and the above-mentioned integrated units can be implemented either in the form of hardware or in the form of software functional units. In addition, the specific names of the functional units and modules are only for the convenience of distinguishing each other, and are not used to limit the protection scope of the present application. For the specific working process of the units and modules in the above system, reference may be made to the corresponding process in the foregoing method embodiments, and details will not be repeated here.

In the above-mentioned embodiments, the descriptions of each embodiment have their own emphases, and for parts that are not detailed or recorded in a certain embodiment, refer to the relevant descriptions of other embodiments.

The above are only the preferred embodiments of the present application, not to limit the present application, any modifications, equivalent substitutions and improvements made without departing from the spirit and principles of the present application are within the scope of protection of in the present application.

What is claimed is:

1. A multiphase inverter circuit, for generating a target alternating current power based on a direct current power provided by a direct current power supply, wherein the multiphase inverter circuit comprises at least one non-interleaved inverter circuit, each of the at least one non-interleaved inverter circuit is configured for outputting a corresponding phase of an alternating current voltage, the target alternating current power comprises the alternating current voltage;

wherein each of the at least one non-interleaved inverter circuit comprises: a first bridge arm unit, a second bridge arm unit, and an inverting coupling transformer;

wherein the first bridge arm unit and the second bridge arm unit each comprises at least two power transistors having a body diode, the first bridge arm unit is configured to generate a first pulse signal based on the direct current power and the second bridge arm unit is configured to generate a second pulse signal based on the direct current power; the first pulse signal and the second pulse signal have a same waveform with a phase difference; the phase difference is greater than a dead time of each bridge arm unit and is less than half of a switching period of the first pulse signal or the second pulse signal;

wherein the inverting coupling transformer comprises a first winding and a second winding coupled to each other; a homopolar end of the first winding is connected to the first bridge arm unit to access the first pulse signal; a heteropolar end of the second winding is connected to the second bridge arm unit to access the second pulse signal; a heteropolar end of the first winding is connected to a homopolar end of the second winding and is an output terminal of a corresponding non-interleaved inverter circuit for outputting the alternating current voltage; and wherein the inverting coupling transformer is configured to form a current loop with the first bridge arm unit and the second bridge arm unit so that the body diode conducts before a corresponding power transistor conducts.

2. The multiphase inverter circuit of claim 1, wherein the first bridge arm unit comprises a first power transistor and a second power transistor, and the second bridge arm unit comprises a third power transistor and a fourth power transistor;

wherein a first conduction end of the first power transistor is connected to a positive output of the direct current power supply, a second conduction end of the first power transistor is connected to a first conduction end of the second power transistor and to the homopolar end of the first winding, and a second conducting end of the second power transistor is connected to a negative output of the direct current power supply;

wherein a first conducting end of the third power transistor is connected to the positive output of the direct current power supply, a second conducting end of the third power transistor is connected to a first conducting end of the fourth power transistor and to the heteropolar end of the second winding, and a second conducting end of the fourth power transistor is connected to the negative output of the direct current power supply.

3. The multiphase inverter circuit of claim 1, wherein each of the at least one non-interleaved inverter circuit further comprises a filter inductor, the filter inductor is connected to the inverting coupling transformer, so that the inverting coupling transformer outputs the alternating current voltage through the filter inductor.

4. The multiphase inverter circuit of claim 1, comprising two non-interleaved inverter circuits for generating the target alternating current power based on the alternating current voltage outputted from the two non-interleaved inverter circuits;

wherein the multiphase inverter circuit further comprise an output filter capacitor and a load resistor, and the output filter capacitor and the load resistor are connected between output terminals of the two non-interleaved inverter circuits.

5. The multiphase inverter circuit of claim 2, comprising two non-interleaved inverter circuits for generating the target alternating current power based on the alternating current voltage outputted from the two non-interleaved inverter circuits;

wherein the multiphase inverter circuit further comprise an output filter capacitor and a load resistor, and the output filter capacitor and the load resistor are connected between output terminals of the two non-interleaved inverter circuits.

6. The multiphase inverter circuit of claim 4, further comprising a first regulation switch, wherein the first regulation switch is connected between the output terminals of the two non-interleaved inverter circuits.

7. The multiphase inverter circuit of claim 4, further comprising a second regulation switch, wherein the second regulation switch is connected between a positive output of the direct current power supply and each of the two non-interleaved inverter circuits.

8. The multiphase inverter circuit of claim 1, comprising three non-interleaved inverter circuits for generating a target alternating current voltage based on the alternating current voltage outputted from the three non-interleaved inverter circuits;

wherein the output terminal of each of the three non-interleaved inverter circuits is respectively grounded through a corresponding output filter capacitor.

9. The multiphase inverter circuit of claim 2, comprising three non-interleaved inverter circuits for generating a target alternating current voltage based on the alternating current voltage outputted from the three non-interleaved inverter circuits;

wherein the output terminal of each of the three non-interleaved inverter circuits is respectively grounded through a corresponding output filter capacitor.

10. The multiphase inverter circuit of claim 1, further comprising a power supply filter capacitor, wherein the power supply filter capacitor is connected between a positive output and a negative output of the direct current power supply.

11. The multiphase inverter circuit of claim 1, further comprising a control circuit, wherein the control circuit comprises a voltage detection module, a current detection module, a logic operation module, and a driver module, the voltage detection module is connected to the current detection module, the current detection module is connected to the logic operation module, and the logic operation module is connected to each power transistor in the multiphase inverter circuit through the driver module; and wherein the voltage detection module and the current detection module are configured to correspondingly generate a first feedback signal and a second feedback signal based on a sampled voltage and a sampled current of the target alternating current power, respectively, and the logic operation module is configured to control the driver module to output a corresponding drive voltage to the each power transistor based on the first feedback signal and the second feedback signal.

12. A modulation method applied to a multiphase inverter circuit, for generating a target alternating current power based on a direct current power provided by a direct current power supply, wherein the multiphase inverter circuit comprises at least one non-interleaved inverter circuit, each of the at least one non-interleaved inverter circuit is configured for outputting a corresponding phase of an alternating current voltage, the target alternating current power comprises the alternating current voltage;

wherein each of the at least one non-interleaved inverter circuit comprises: a first bridge arm unit, a second bridge arm unit, and an inverting coupling transformer;

wherein the first bridge arm unit and the second bridge arm unit each comprises at least two power transistors having a body diode, the first bridge arm unit is configured to generate a first pulse signal based on the direct current power and the second bridge arm unit is configured to generate a second pulse signal based on the direct current power; the first pulse signal and the second pulse signal have a same waveform with a phase difference; the phase difference is greater than a dead time of each bridge arm unit and is less than half of a switching period of the first pulse signal or the second pulse signal;

wherein the inverting coupling transformer comprises a first winding and a second winding coupled to each other; a homopolar end of the first winding is connected to the first bridge arm unit to access the first pulse signal; a heteropolar end of the second winding is connected to the second bridge arm unit to access the second pulse signal; a heteropolar end of the first winding is connected to a homopolar end of the second winding and is an output terminal of a corresponding non-interleaved inverter circuit for outputting the alternating current voltage; and wherein the inverting coupling transformer is configured to form a current loop with the first bridge arm unit and the second bridge arm unit so that the body diode conducts before a corresponding power transistor conducts, and wherein the modulation method comprises:

generating and outputting to the first bridge arm unit a first upper bridge arm drive voltage and a first lower bridge arm drive voltage for driving the first bridge arm unit to generate the first pulse signal, a signal of the first upper bridge arm drive voltage and a signal of the first lower bridge arm drive voltage having opposite polarities, and a high level of the first upper bridge arm drive voltage and a high level of the first lower bridge arm drive voltage having a corresponding dead time therebetween; and generating and outputting to the second bridge arm unit a second upper bridge arm drive voltage and a second lower bridge arm drive voltage for driving the second bridge arm unit to generate the second pulse signal, a signal of the second upper bridge arm drive voltage and a signal of the second lower bridge arm drive voltage having opposite polarities, and a high level of the second upper bridge arm drive voltage and a high level of the second lower bridge arm drive voltage having a corresponding dead time therebetween;

wherein the first upper bridge arm drive voltage and the second upper bridge arm drive voltage have a same waveform with the phase difference, and the first lower bridge arm drive voltage and the second lower bridge arm drive voltage have a same waveform with the phase difference.

13. The modulation method of claim 12, wherein the first bridge arm unit comprises a first power transistor and a second power transistor, and the second bridge arm unit comprises a third power transistor and a fourth power transistor;

wherein a first conduction end of the first power transistor is connected to a positive output of the direct current power supply, a second conduction end of the first power transistor is connected to a first conduction end of the second power transistor and to the homopolar end of the first winding, and a second conducting end of the second power transistor is connected to a negative output of the direct current power supply;

wherein a first conducting end of the third power transistor is connected to the positive output of the direct current power supply, a second conducting end of the third power transistor is connected to a first conducting end of the fourth power transistor and to the heteropolar end of the second winding, and a second conducting end of the fourth power transistor is connected to the negative output of the direct current power supply.

14. The modulation method of claim 12, wherein each of the at least one non-interleaved inverter circuit further comprises a filter inductor, the filter inductor is connected to the inverting coupling transformer, so that the inverting coupling transformer outputs the alternating current voltage through the filter inductor.

15. The modulation method of claim 12, wherein the multiphase inverter circuit comprises two non-interleaved inverter circuits for generating the target alternating current power based on the alternating current voltage outputted from the two non-interleaved inverter circuits;

wherein the multiphase inverter circuit further comprise an output filter capacitor and a load resistor, and the output filter capacitor and the load resistor are connected between output terminals of the two non-interleaved inverter circuits.

16. The modulation method of claim 15, wherein the multiphase inverter circuit further comprises a first regulation switch, wherein the first regulation switch is connected between the output terminals of the two non-interleaved inverter circuits.

17. The modulation method of claim 15, wherein the multiphase inverter circuit further comprising a second regulation switch, wherein the second regulation switch is connected between a positive output of the direct current power supply and each of the two non-interleaved inverter circuits.

18. The modulation method of claim 12, wherein the multiphase inverter circuit comprises three non-interleaved inverter circuits for generating a target alternating current voltage based on the alternating current voltage outputted from the three non-interleaved inverter circuits;

wherein the output terminal of each of the three non-interleaved inverter circuits is respectively grounded through a corresponding output filter capacitor.

19. The modulation method of claim 12, wherein the multiphase inverter circuit further comprises a power supply filter capacitor, wherein the power supply filter capacitor is connected between a positive output and a negative output of the direct current power supply.

20. The modulation method of claim 12, wherein the multiphase inverter circuit further comprises a control circuit, wherein the control circuit comprises a voltage detection module, a current detection module, a logic operation module, and a driver module, the voltage detection module is connected to the current detection module, the current detection module is connected to the logic operation module, and the logic operation module is connected to each power transistor in the multiphase inverter circuit through the driver module; and wherein the voltage detection module and the current detection module are configured to correspondingly generate a first feedback signal and a second feedback signal based on a sampled voltage and a sampled current of the target alternating current power, respectively, and the logic operation module is configured to control the driver module to output a corresponding drive voltage to the each power transistor based on the first feedback signal and the second feedback signal.

* * * * *